United States Patent

[11] 3,630,425

[72] Inventor Gunter Wilkens
 Kelkheim/Taunus, Germany
[21] Appl. No. 816,984
[22] Filed Apr. 17, 1969
[45] Patented Dec. 28, 1971
[73] Assignee Messer Griesheim GmbH
 Frankfurt am Main, Germany
[32] Priority Apr. 20, 1969
[33] Germany
[31] P 17 65 255.4

[54] ELECTRODE WIRE ADVANCE FOR ARC WELDING
 5 Claims, 5 Drawing Figs.
[52] U.S. Cl. .................................................. 226/108,
 314/69
[51] Int. Cl. ..................................................... B65h 17/20

[50] Field of Search............................................ 219/136;
 314/69, 78; 226/93, 108, 111, 181, 186, 187

[56] References Cited
 UNITED STATES PATENTS

| | | | |
|---|---|---|---|
| 3,293,477 | 12/1966 | Lobosco........................ | 314/69 |
| 3,344,305 | 9/1967 | Ogden........................... | 226/108 |
| 3,413,915 | 12/1968 | Goodwin....................... | 226/181 X |

*Primary Examiner*—Richard A. Schacher
*Attorney*—Connolly and Hutz

ABSTRACT: An electrode wire advance for arc welding utilizes an electrode wire supplied through a flexible hose and acted upon by two drives. One wire drive pushes or unwinds the wire and is connected thereto by a coupling. The other wire drive pulls the wire from its hose and pushes it to the torch.

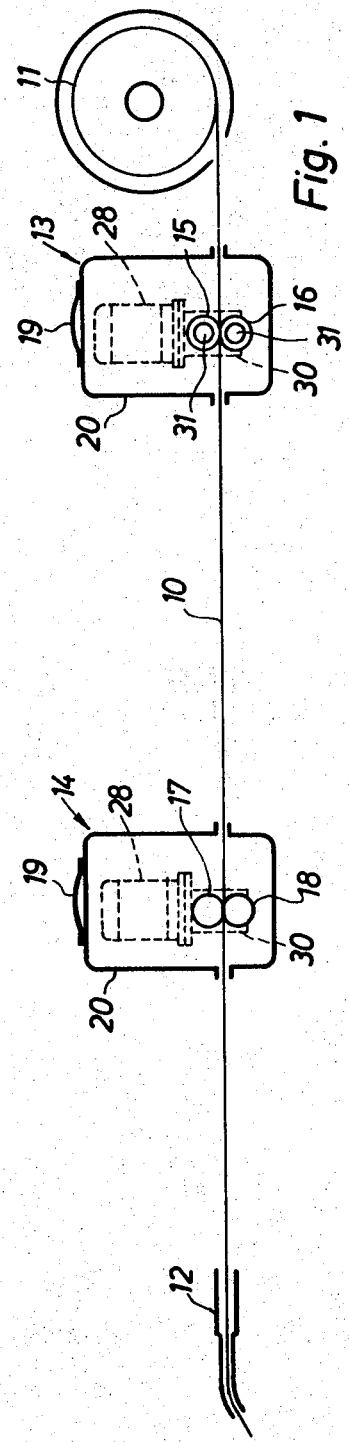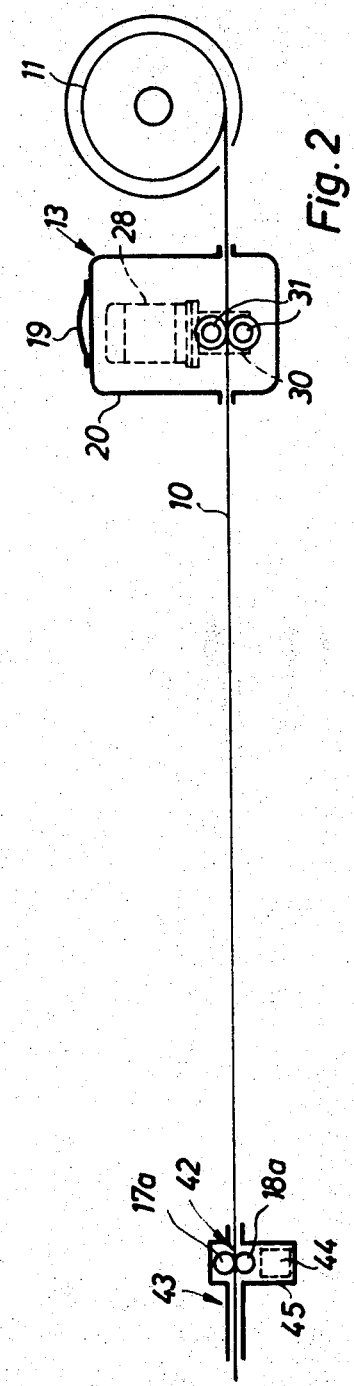

3,630,425

1

ELECTRODE WIRE ADVANCE FOR ARC WELDING

BACKGROUND OF INVENTION

This invention relates to an electrode wire advance for arc welding wherein the electrode wire is supplied to the apparatus through a flexible hose and wherein two drives act on the electrode wire, of which one unwinds the wire from the storage reel and leads into the flexible hose and the other pushes the wire to the arc.

The object of the invention is to avoid cracking or rolling of the wire, disadvantages which set in particularly in long, flexible wire conduction hoses. According to the German Pat. No. 1,099,666 it has already been tried to solve this problem in that the first (pushing) wire drive was driven by a controlled motor and determined by the speed of the wire supply; and the second wire drive conducted the wire, pulling under slippage, where in starting, conducting and stopping of the wire advance, the wire was always kept under a light tension. In order to materialize this thought, it is required, however, to choose for the pulling drive a motor with a soft characteristic (increasing the pulling force with decreasing the wire speed as a result of increasing frictional resistance), while the pushing drive must be provided with a motor with a stronger characteristic. In starting, the wire is pushed immediately by the rear drive with full pushing force into the hose, while at the front drive—in accordance with the weak characteristic of the pulling motor—the full tractive force is not yet available. The result is a wire rolling which—if it remains in the flexible range—leads to a jerky emergence of the wire from the hose. In plastic wire forming, the wire emerges from the hose in rolling form so that it no longer can be introduced into the torch nozzle.

SUMMARY OF INVENTION

According to the invention, these disadvantages are avoided in that the pulling drive is connected with the wire by pressing upon it on both sides and the pushing drive by a coupling which prevents exceeding of a predetermined pushing force on the wire.

By such a limitation of the pushing force on the wire, it is possible without difficulty to avoid the danger of a rippling of the wire existing particularly in the starting procedure. In order to utilize to the utmost, the generated power of the pushing force corresponds to the buckling load of the wire. As the coupling or slip clutch, a slipping coupling, known per se, is suitably chosen whose slip-through momentum can be adjusted. In view of an optimum utilization of the pushing drive, it is recommended furthermore to have such a design of the coupling that the pushing force of the pushing drive on the wire during the slip-through of the coupling corresponds to the buckling load of the wire. This can be achieved by an abrasive coating with a low coefficient of friction.

A ripping of the wire should not be feared, since the pressure of the front driving roller on the wire can be adjusted in such a manner that they slip through if the resistance force of the wire or the pull of the traction drive becomes too great. As for the rest, an increase of the pull with lowering of the rate of revolutions of the motor (reduction of the wire advance) can be easily avoided by means of an essentially constant characteristic of both drives, predominantly of the pulling drive.

THE DRAWINGS

The invention is described in more detail by way of the exemplified embodiments in the drawing and the disclosure below.

FIG. 1 shows (schematically perspective wire drive for the protective gas welding with melting off electrode;

FIG. 2 shows (schematically) another design of a wire drive;

DETAILED DESCRIPTION

Figure 3:
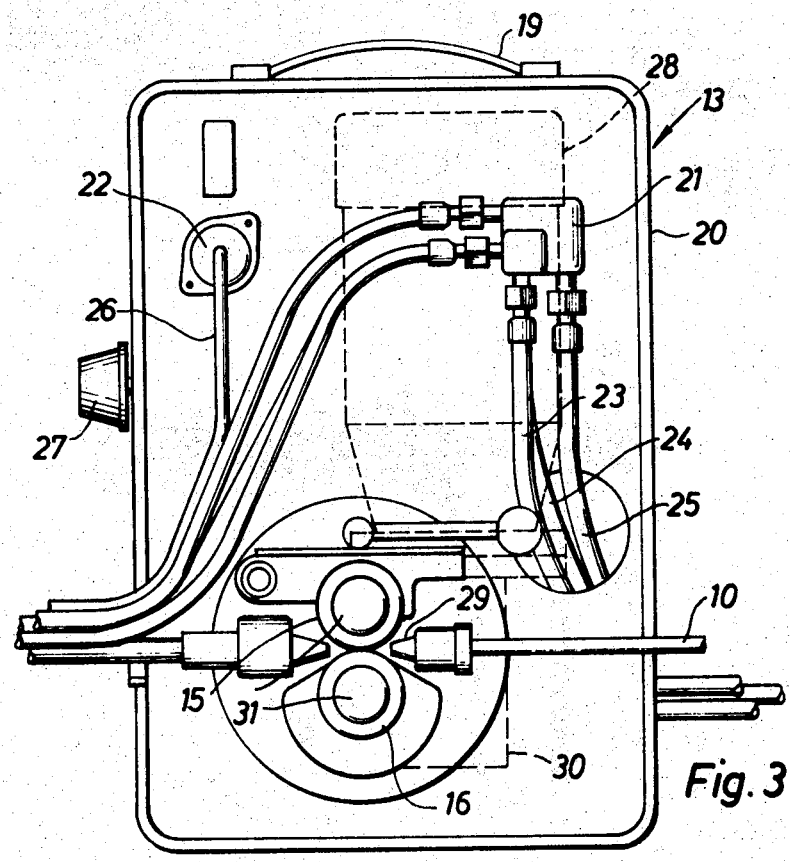
FIG. 3 shows the pushing station of the wire drive according to FIGS. 1 and 2.

In the wire drive according to FIG. 1, the welding wire is designated with 10, the roller or reel, from which it is unwound, is designated with 11, and the welding torch with 12. For driving the wire 10, there are provided a pushing station 13 and a pulling station 14. Between pushing station 13 and pulling station 14 there extends the wire guide hose, which for simplification purposes is not illustrated in FIGS. 1 and 2. The pushing station 13 unwinds the wire from the roller 11 and pushes it into the wire guiding hose, while the pulling station 14 pulls the wire from the hose and conducts it to the torch 12. The transmission of the driving force to the wire 10 takes place, with respect to pushing station 13 as well as pulling station 14, by means of a pair of rollers 15, 16 or 17, 18.

The pushing station 13, which in FIG. 3 is again illustrated in all its particulars, consists of a boxlike case 20 provided with a handle 19 wherein is situated the actual pushing drive, described in more detail below. Within case 20 there are further arranged terminals 21 and 22 respectively for the coolant inlet and outlet conduits 23, 24, the protective gas conduit 25 and the control conduit 26, respectively. Regulating button 27 regulates the rate of revolutions of a driving motor 28.

The driving motor 28 is indicated by dotted lines in FIGS. 1–3 and represents a motor with stationary characteristic, preferably a direct current shunt wound electric motor. However, a frequency-controlled synchronous or asynchronous motor may also be used with electronic or mechanical control.

Figure 5:
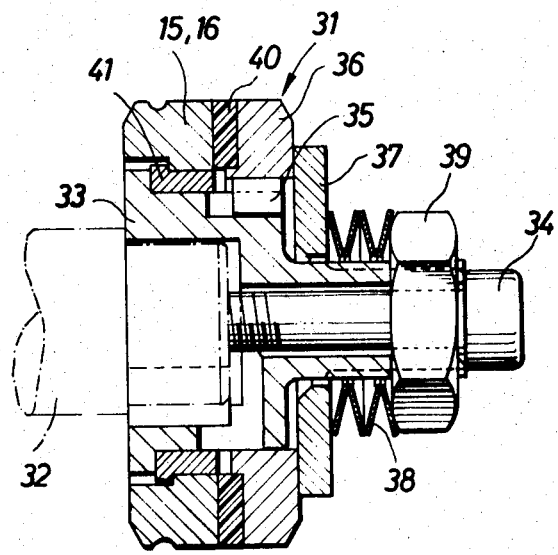
FIG. 5 shows a slipping coupling in the pushing station according to FIGS. 1 and 2.

The pushing drive of the wire proceeds in particular as follows: Wire 10 reaches through a nozzle 29 between the rollers 15, 16. Rollers 15, 16, both of which are driven, press upon the wire at both sides and thus produce connection with them. In other words by pressing upon the wire the rollers produce a tensional force connection with the wire. The drive of the rollers 15, 16 comes from motor 28 over a gearing 30 by means of a slipping coupling 31, which in FIG. 5 is illustrated individually. The drive shaft 32 in FIG. 5 is indicated by dotted lines. Shaft 32 drives by means of a nonillustrated adjusting spring or the like a casing part 33, which is mounted on the drive shaft by means of a screw 34. The casing part 33 is stationarily connected with a coupling disk 36 by means of an adjusting spring 35. The coupling disk 36 is arranged axially slidable on the adjusting spring 35 and is pressed against a friction disk 40 by a disk 37 and cup springs 38 whose initial stress is adjustable by a nut 39. The friction disk 40 in turn is engaged with the actual wire driving rollers 15 and 16 which are supported turnably on a bushing 41 opposite the casing part 33. A synchronization of rollers 15, 16 occurs by way of friction disk 40 and thus is dependent on the initial stress of springs 38. The initial stress of springs 38 is suitably so chosen that the coupling slips upon reaching the buckling load of the welding wire. If a friction disk with relatively low coefficient of friction is employed, the rotation momentum transmitted in the slipping of the coupling remains about equal to the limiting moment of rotation shortly before the slipping.

The pull station 14 corresponds, regarding the drive, choice of the driving motor, etc., to the above-described pushing station 13 and therefore this needs no further explanation. The difference as compared to the pushing station is only in that the rollers 17, 18 are driven not by way of a slipping coupling slip clutch but directly by the gearing 30. Thus the wire engaging rollers are driven directly by its drive at a constant speed in that no slip clutch is provided therefor.

Figure 4:
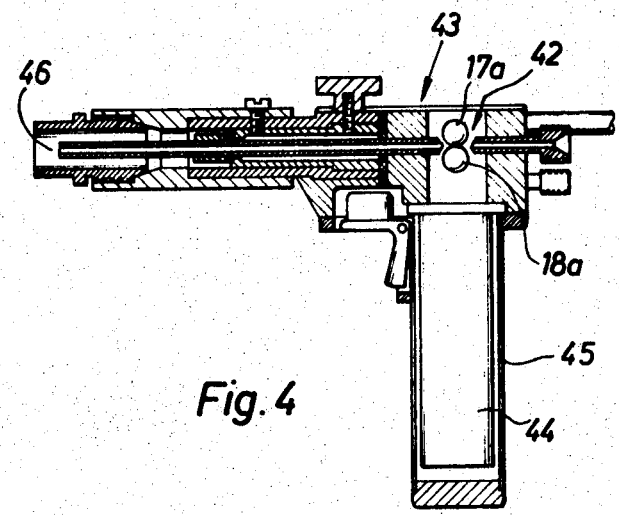
FIG. 4 shows a welding torch with built-in pulling station according to the design of FIG. 2.

In the design of FIGS. 2 and 4, the pushing station corresponds to the design of FIGS. 1 and 3. The pulling station 42, however, is arranged directly within the welding torch 43. The driving rollers numbered 17a, 18a are driven by a motor 44 which is arranged inside the torch handle 45. The design of FIGS. 2 and 4 is particularly suited for short hose lengths. However, if the design of FIG. 1 is combined with a torch according to FIGS. 2 and 4, a welding at a considerable distance from the position of the current source is possible. The pulling station 14 functions in this connection partially as pushing station, while the pulling station 42 within the torch, irrespective of the supply of the wire to the torch nozzle 46 comes up to an exclusive pulling function.

I claim:

1. An arc-welding apparatus comprising an arc-welding torch, a wire storage reel with a wire electrode thereon, a wire advance device between said arc-welding torch and said storage reel, said wire advance device including a flexible hose, a first advance means between said storage reel and said hose for pulling the wire from said storage reel and pushing it into said hose, said first advance means including at least one slip means, said slip means being a slip clutch, and second advance means between said hose and said torch for pulling the wire out of said hose and pushing it into said torch, said second advance means comprising wire engaging means and drive means, and said wire engaging means being driven by said drive means at a constant speed.

2. An apparatus as set forth in claim 1, wherein said first advance means has a pushing force during the slippage of the clutch which is not greater than the buckling load of the wire.

3. An apparatus as set forth in claim 2, wherein said second advance means includes rollers driven directly by gear means without the inclusion of a slip clutch.

4. An apparatus as set forth in claim 3, wherein said first advance means includes a direct current shunt wound electric motor.

5. An apparatus as set forth in claim 4, wherein said second advance means is mounted in said torch.

* * * * *